United States Statutory Invention Registration [19]

[11] Reg. Number: H398

Lemieux et al.

[43] Published: Jan. 5, 1988

[54] CONTINUOUSLY VARIABLE TRANSMISSION WITH SPLIT TORQUE HYDROKINETIC UNIT

[76] Inventors: George E. Lemieux, 36316 Dardanella, Livonia, Mich. 48152; Alan R. Fisher, 1320 Porter, Apt. 81, Dearborn, Mich. 48124

[21] Appl. No.: 902,983

[22] Filed: Sep. 2, 1986

[51] Int. Cl.[4] ..... F16H 37/00; F16H 47/08

[52] U.S. Cl. ..... 74/689; 74/688

[58] Field of Search ..... 74/688, 689, 718, 740, 74/701, 700, 695

[56] References Cited

U.S. PATENT DOCUMENTS

| | | | |
|---|---|---|---|
| 2,135,282 | 11/1938 | Fottinger | 74/688 |
| 3,125,900 | 3/1964 | Moore | 74/688 |
| 3,203,278 | 8/1965 | General | 74/690 |
| 3,304,803 | 2/1967 | Stockton | 74/665 |
| 3,924,489 | 12/1975 | Yasuda | 74/718 X |
| 4,354,401 | 10/1982 | Omitsu | 74/689 |
| 4,393,731 | 7/1983 | Croswhite et al. | 74/689 |
| 4,548,099 | 10/1985 | Wayman et al. | 74/689 |
| 4,549,447 | 10/1985 | Sakakibara | 74/689 |
| 4,602,525 | 7/1986 | Moroto et al. | 74/695 X |

FOREIGN PATENT DOCUMENTS

| | | | |
|---|---|---|---|
| 0057558 | 4/1983 | Japan | 74/688 |
| WO85/02663 | 6/1985 | PCT Int'l Appl. | 74/701 |

*Primary Examiner*—David H. Brown
*Assistant Examiner*—Michael J. Carone

[57] ABSTRACT

An infinitely variable transmission comprising a belt and sheave assembly, the input of which is adapted to be connected to an engine, a hydrokinetic unit, and a torque splitter gear unit located between the torque output portions of the belt and sheave assembly and the input member of the hydrokinetic unit, the output member of the hydrokinetic unit being connected to a driven shaft through final drive gearing whereby only a portion of the torque is transferred hydrokinetically through the hydrokinetic unit thereby increasing the operating efficiency by avoiding hydrokinetic losses and improving smoothness in the ratio changes.

1 Claim, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

| | C1 | C2 | C3 | Steel Belt Ratio | Conv. STR | Torque Split STR | Gearing Ratio | o/a Trans. Ratio |
|---|---|---|---|---|---|---|---|---|
| Fwd | X | X | | 2.394/.442 | 2.500 | 1.408 | 4.729 | 15.940/2.090 |
| N | | | | | | | 4.729 | |
| Rev | X | | X | 2.394 | 2.500 | 1.408 | 4.729 | 15.940/11.321 |

| | C1 | C2 | Steel Belt Ratio | Gearing Ratio | O/A Trans. Ratio |
|---|---|---|---|---|---|
| Fwd | X | | 2.394/.442 | 4.729 | 11.321/2.090 |
| Rev | | X | 2.394 | 4.729 | 11.321 |
| N | | | | 4.729 | |

CONTINUOUSLY VARIABLE TRANSMISSION WITH SPLIT TORQUE HYDROKINETIC UNIT

BACKGROUND OF THE INVENTION

Infinitely variable belt or chain drives for automotive vehicles usually include adjustable sheaves that are connected by a belt or chain. The ratio of the drive is changed by appropriately adjusting the effective pitch diameter of the sheaves. This is taught, for example, by Moan U.S. Pat. No. 3,315,049, assigned to the assignee of this invention, and by Smirl U.S. Pat. No. 4,433,594. The ratio range can be extended by incorporating torque transmitting gearing in the torque flow path defined by the sheave assembly. Examples of infinitely variable drives with extended ratio ranges can be seen in Omitsu U.S. Pat. No. 4,354,401; Stockton U.S. Pat. No. 3,304,803 and General U.S. Pat. No. 3,203,278. The General and Stockton patents are assigned to the assignee of this invention.

It is common practice, furthermore, to use in combination with the gearing and the infinitely variable portions of the driveline a fluid coupling or torque converter either to extend the ratio range or to provide smoothness in the torque delivery. This is shown in the Stockton and General patents as well as Moore U.S. Pat. No. 3,125,900. Unlike the present invention the Stockton and General patents show an infinitely variable friction drive rather than a belt and sheave assembly, but those references do show the concept of combining a gear system with an infinitely variable unit. The Moore patent, which also is assigned to the assignee of this invention, does not show an infinitely variable drive but rather a positive chain drive in combination with a torque converter and a gear system.

GENERAL DESCRIPTION OF THE INVENTION

Our instant invention is distinguished from the drives of the references mentioned above by the inclusion of a hydrokinetic unit in combination with an infinitely variable unit and a split torque gear unit wherein only a portion of the torque distributed through the infinitely variable gear system passes through the hydrokinetic unit. The Omitsu and General patents, for example, show a split torque gear system where a hydrokinetic unit receives all of the torque delivered through the infinitely variable portions of the transmission. Similarly, the output portions of the chain drive of the Moore patent distribute torque entirely through a fluid coupling before it reaches the split torque gear unit that connects the turbine to the output shaft.

In transmissions in which the torque flow path includes a hydrokinetic torque converter or fluid coupling with a split torque gear unit on the output side of the hydrokinetic unit, the turbine would rotate backwards during a start up mode as the vehicle accelerates from a standing start. Then as the vehicle accelerates, the turbine would slow down and then begin to rotate in a forward driving direction. This phenomenon would induce unacceptable driveline vibrations. With our present invention, in contrast, the split torque gear unit is arranged so that the torque splitting can be used throughout the transmission ratio range and only a portion of the torque is distributed through the hydrokinetic unit. This allows the hydrokinetic unit to act as a tighter unit with reduced slip (reduced size factor). Thus by arranging the hydrokinetic unit of our invention on the torque flow downstream side of the infinitely variable belt and sheave assembly full torque multiplication can be achieved without causing the hydrokinetic unit to slip to such an extent that the engine will race on startup. As the vehicle accelerates the slippage is dramatically reduced in comparison to devices of the kind shown in the prior art references. For example, the hydrokinetic unit may be designed with such tightness that it would slip only one or two percent at wide open throttle engine operation, instead of the usual ten percent, without any sacrifice in the driveline smoothness. There is no need for a lockup clutch in the hydrokinetic unit to achieve improved fuel efficiency because of the tightness of the converter. Thus, no shift harshness is present due to engagement of a lockup clutch.

PARTICULAR DESCRIPTION OF THE INVENTION

Figures 1, 1A:
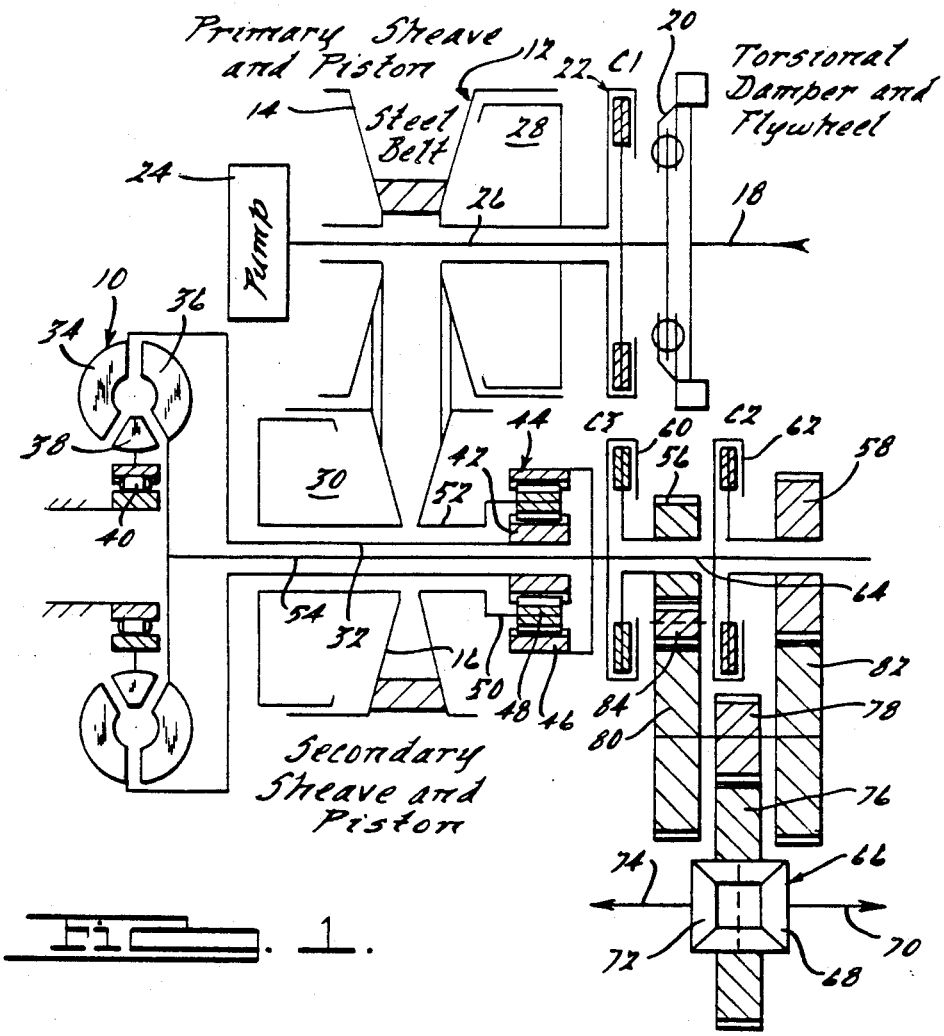
FIG. 1 shows in schematic form the overall arrangement of the principal elements of our invention, including the hydrokinetic torque converter, a belt and sheave assembly, split torque gearing and final drive gearing.
FIG. 1A is a chart that shows the engagement and release pattern for the clutches of the mechanism of FIG. 1 to achieve either forward, neutral or reverse drive.
Figure 3:
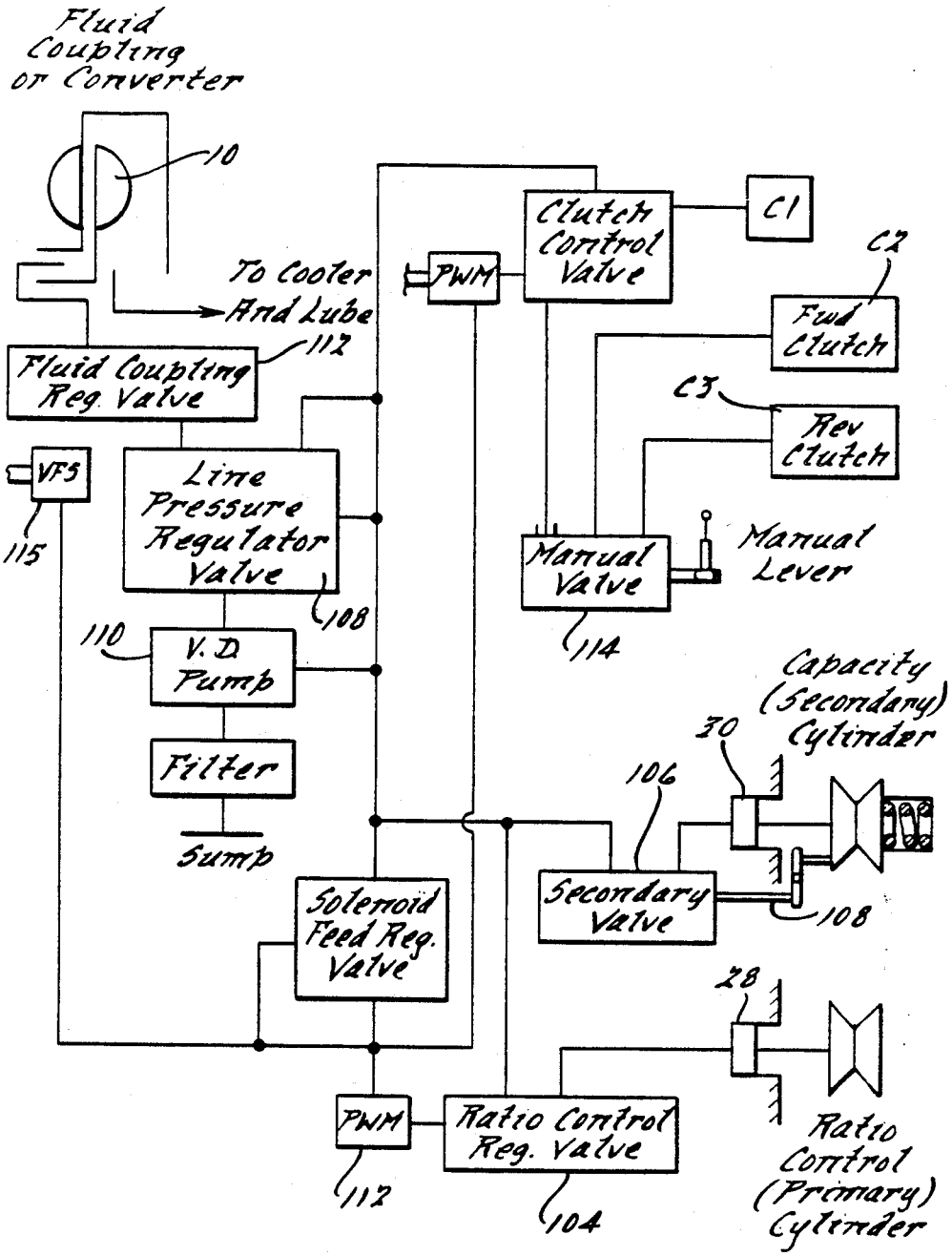
FIG. 3 is a schematic line diagram of a control system for either the mechanism of FIG. 1.
Figure 4:
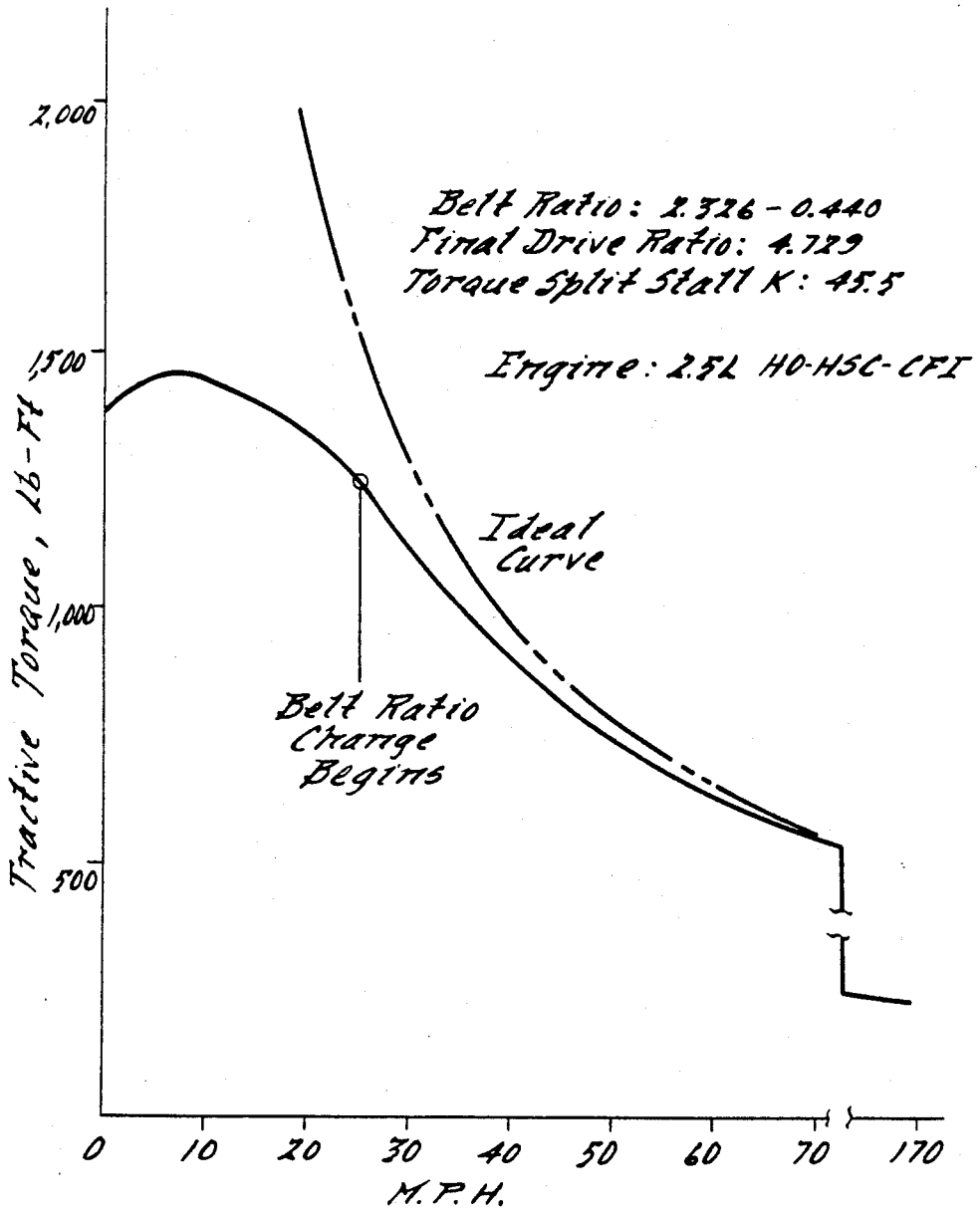
FIG. 4 is a performance chart for a vehicle that would be equipped with the transmission of either FIG. 1 or FIG. 2.

In FIG. 1, numeral 10 designates a hydrokinetic torque converter. Numeral 12 designates an infinitely variable belt and sheave assembly comprising primary sheave 14 and secondary sheave 16. A steel belt drivably connects the sheaves 14 and 16. Torque input shaft 18 corresponds to the crankshaft of the internal combustion engine for a vehicle. Shaft 18 is connected by a damper and flywheel assembly 20 to the input side of a neutral clutch 22. A fluid pump 24, which supplies pressurized fluid to operate the servos for the sheave assemblies and the control system of FIG. 3, is connected drivably through a central drive shaft 26, which extends through the sheave assembly 12 to the flywheel and damper assembly 20.

The adjustable primary sheave 14 comprises a servo 28 that is adjustable axially with respect to the axis of shaft 18 to increase or decrease the effective pitch diameter of the conical sheave portions. A corresponding servo 30 adjusts the conical sheave portions of the secondary sheave 16 thereby increasing and decreasing its effective pitch diameter of the same.

A sleeve shaft 32 extends through the secondary sheave 16. It is connected to impeller 34 of the torque converter 10. Converter 10 includes also a turbine 36 arranged in toroidal fluid flow relationship with respect to impeller 34. Bladed stator 38, includes overrunning brake 40, is located between the flow exit section of turbine 36 and the flow entrance section of impeller 34.

Sleeve shaft 32 is connected to sun gear 42 of a simple planetary gear unit 44. Gear unit 44 includes ring gear 46, planet pinions 48 and a carrier 50 which supports the pinions 48. The carrier is connected to the secondary sheave 16 through drive sleeve 52.

Ring gear 46 is connected drivably to a central drive shaft 54 which extends through the sleeve shaft 32 and which is connected directly to turbine 36. Ring gear 46 which serves as the torque output element of the planetary gearing 44, is adapted to be clutched either to reverse gear 56 or forward drive gear 58 through reverse clutch 60 or forward clutch 62, respectively. The torque input element of clutch 62 is connected to shaft 64 which extends through gear 56 to the input element of clutch 60. The output element of clutch 60 is connected directly to reverse gear 56.

Final drive gearing for the transmission of FIG. 1 includes differential gear assembly 66, which comprises a first side gear 68 connected to one axle shaft 70 and a second side gear 72 connected to a second axle shaft 74. Differential pinions carried by a carrier mesh with the side gears 72 and 68. The carrier rotates with and is connected to differential ring gear 76 which meshes with final drive pinion 78, the latter being connected to reverse gear 80 and forward drive gear 82. Reverse gear 80 meshes with reverse idler 84 which in turn meshes with reverse gear 56.

FIG. 1A shows the clutch engagement and release pattern to establish forward drive, neutral and reverse. Forward drive is obtained by engaging clutch $C_1$ (22) and clutch $C_2$ (62). Simultaneously, reverse drive is obtained by engaging simultaneously clutches $C_1$ and $C_3$ (60). For purposes of understanding FIG. 1A, clutch $C_1$ is the forward clutch 22 of FIG. 1, clutch $C_2$ is the forward clutch 62 of FIG. 1 and clutch $C_3$ is the reverse clutch 60 of FIG. 1.

The right hand column of FIG. 1A shows the overall ratio which is the product of the gearing ratio, the steel belt ratio and the torque split stall torque ratio (STR). The torque split stall torque ratio is the converter stall torque ratio (STR) in combination with the torque split gearset.

The torque converter is located on the torque flow downstream side of the split torque gear unit 44 so that only a portion of the torque is distributed to shaft 54 and to the input side of the clutch $C_3$ through the torque converter. The balance of the torque is distributed mechanically from the ring gear of the gear unit 44 to the torque input side of the clutch $C_3$. Thus the overall efficiency of the transmission is improved because converter slip is reduced by reason of the reduced torque level transferred hydrokinetically. This result is obtained without affecting the overall torque ratio spread in comparison to known infinitely variable belt and sheave assemblies of comparable size.

Figures 2, 2A:
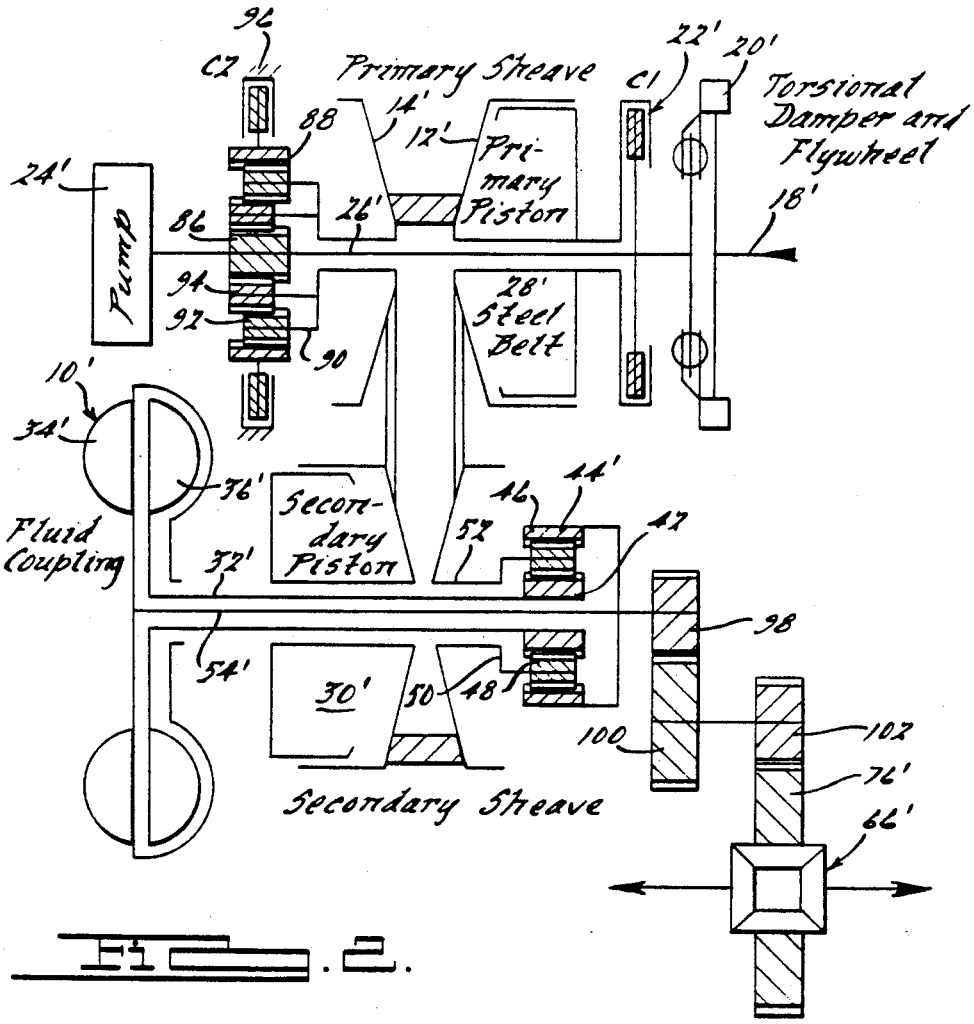
FIG. 2 is a view in schematic form showing an alternate embodiment of the invention wherein the reverse gearing is located on the torque input side of the infinitely variable belt and sheave assembly rather than on the torque output side of the belt and sheave assembly.
FIG. 2A is a chart that shows the clutch engagement and release pattern for the mechanism of FIG. 2 for the forward, reverse and neutral drive modes.

FIG. 2 is a modification of the FIG. 1 design wherein the reverse gearing is located on the axis of the engine rather than near the final drive gearing. In other respects the function and structure of the FIG. 2 embodiment resembles the structure and function of the FIG. 1 embodiment. The common elements of FIGS. 1 and 2 have been designated by similar reference characters and notations although prime notations have been added to the reference characters designating in corresponding elements of FIG. 2.

The FIG. 2 embodiment includes a fluid coupling rather than a torque converter because the location of the reverse gearing on the engine axis causes the turbine to rotate backward. A fluid coupling is much more effective as a torque transmitting device than a fluid torque converter because the geometry of the fluid coupling blading is more adaptable for torque transfer in a reverse direction.

In FIG. 2 shaft 26', which drives the pump 24', is connected to sun gear 86 of a reverse planetary gear assembly 88. The planetary gear assembly includes in addition to sun gear 86, planetary carrier 90 and two sets of planetary pinions 92 and 94 which mesh with each other.

Reverse brake 96, which is designated by the reference character $C_2$, selectively anchors the ring gear 88 to effect reverse drive. The output element for the planetary gearing is the carrier 90. It is connected to the input side of the primary sheave assembly 14'.

Clutch 22', which is designated by the symbol $C_1$ is engaged to effect forward drive. This drives the primary sheave 14' in a forward driving direction.

The final drive gearing of the FIG. 2 embodiment comprises stepped ratio gearing comprising elements 98, 100 and 102. Elements 100 and 102 function as a cluster gear assembly that engages the ring gear 76' of the differential gear unit 66'.

The chart of FIG. 2A shows the clutch engagement and release pattern to establish forward drive, reverse and neutral. Like FIG. 1A, FIG. 2A shows the overall transmission ratio which is the product of the gearing ratio and the ratio of the sheave assembly.

FIG. 3 is an diagram showing a control system for effecting ratio changes in the FIG. 1 construction. The servo 28 for the primary sheave assembly is shown in FIG. 3 as a piston and cylinder under the control of the ratio control valve 104. The pressure in the servo 30 for the secondary sheave assembly is controlled by a secondary pressure control valve 106 which also is under the control of the ratio control valve 104. It receives a feedback position signal through an appropriate feedback mechanism 108 so that the position of the sheave portions, one with respect to the other, can be sensed. Line pressure is supplied by line pressure regulator valve 108 which is supplied by a variable displacement pump 110.

Fluid coupling pressure is distributed from the main pressure regulator valve 108 to a fluid coupling regulator valve 112. A variable force solenoid 115 controls the magnitude of the feed signal for the pulse width modulator for the ratio control regulator valve.

Forward and reverse clutch pressure for the clutches C2 and C3 is received from a driver controlled manual valve 114.

Having described a preferred form of our invention, what we claim and desire to secure by U.S. Letters Patents is:

1. A hydromechanical, infinitely variable transmission mechanism comprising:

an input shaft on a first axis adapted to be connected to an engine, a countershaft axis parallel to the first axis;

a first adjustable sheave assembly mounted on said first axis, a second adjustable sheave assembly mounted on said countershaft axis;

a friction belt drive member connecting drivably the first adjustable sheave assembly with the second adjustable sheave assembly;

a split torque gear unit comprising a sun gear, a ring gear and a planet carrier on the torque flow downstream side of said second adjustable sheave assembly on the countershaft axis, a torque input element of said torque split gear unit being connected to the torque output side of said second adjustable sheave assembly;

a hydrokinetic unit having a turbine and an impeller in fluid flow relationship, said impeller being connected drivably to the first torque output element of said split torque gear unit, the turbine of said hydrokinetic unit being connected to a second torque output element of said split torque gear unit;

a torque output shaft; and final drive gear means for connecting said second torque output element of said split torque gear unit to said torque output shaft.

* * * * *